Figure 1:
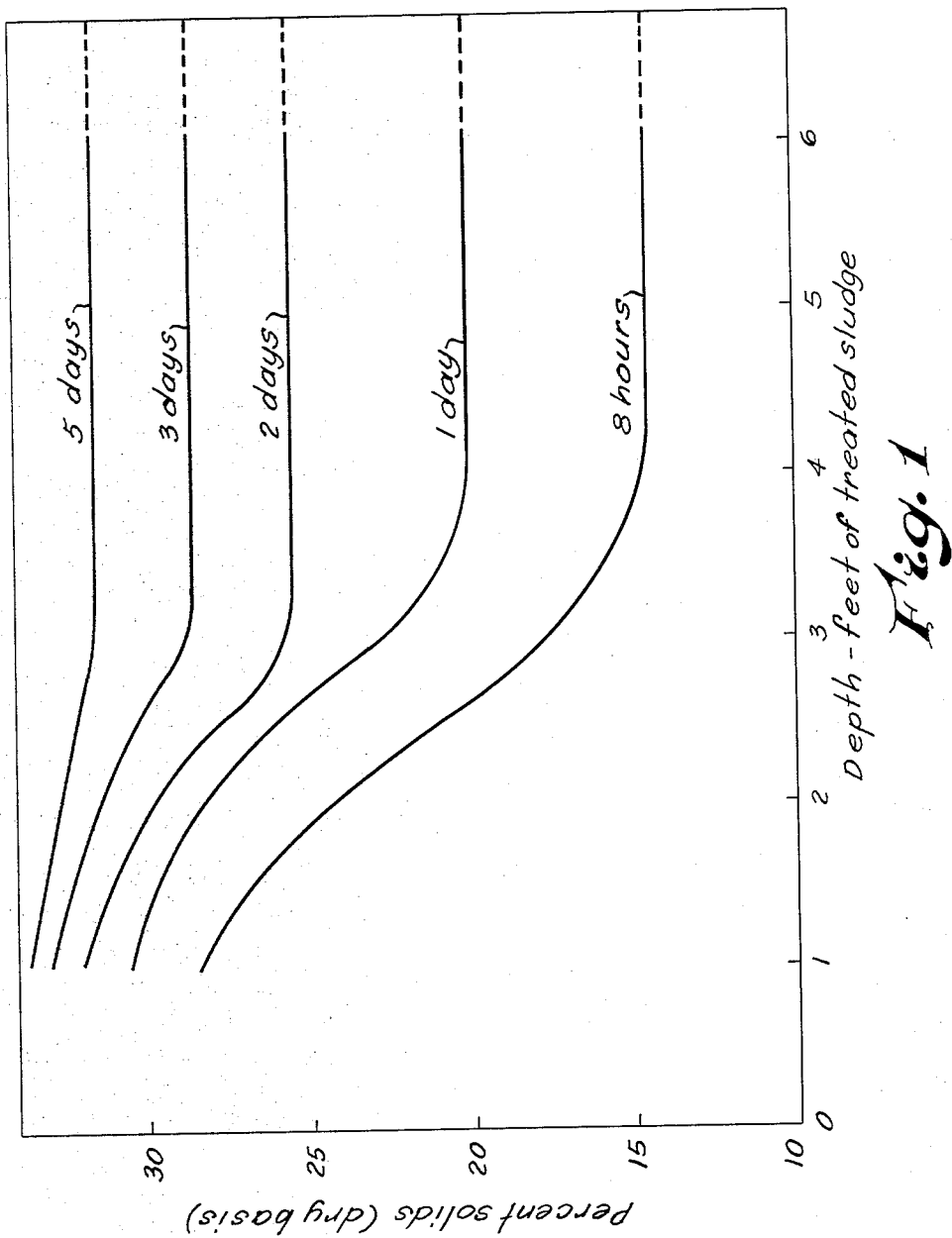

May 24, 1966 S. KELMAN ETAL 3,252,900
DEWATERING SEWAGE SLUDGE BY GRAVITY
Filed Nov. 18, 1963 2 Sheets-Sheet 1

INVENTORS.
Sheldon Kelman
BY Charles P. Priesing

Griswold & Burdick
ATTORNEYS 3,252,900
DEWATERING SEWAGE SLUDGE
BY GRAVITY
Sheldon Kelman and Charles P. Priesing, Midland, Mich., assignors to The Dow Chemical Company, Midland, Mich., a corporation of Delaware
Filed Nov. 18, 1963, Ser. No. 324,548
8 Claims. (Cl. 210—54)

The present invention relates to a novel method for dewatering sewage sludges by gravity and, more particularly, the invention concerns dewatering sewage sludges over filtering substrata utilizing the pressure as the result of increased sludge depth as a dewatering aid.

Heretofore, a common practice has been to dry sewage sludges in static volumes or ponds over sand, rock or other filtering substrata. Usually, a sand bed is prepared over gravel sometimes underlain with drain tile. The filtrate may discharge into the wasting streams from the sewage plant or occasionally into earlier stages of the sewage treatment process as a recycle stream. Sewage sludge is flowed onto such filtering beds in depths up to one foot. Ultimately upon drying by the dual mechanism of water filtration through the sand bed and evaporation to the atmosphere above, a solid sludge cake is obtained. Ordinarily, such dewatering requires from 3 to 6 weeks to achieve a satisfactorily dry sludge cake. This cake is removed from the bed and any sand incorporated in the cake replaced on the surface of the bed to prepare it for another drying cycle.

Illustratively, in designing such filtering and drying beds for digested sludge under present technology, a recommended standard is one square foot of bed surface per capita served by the sewage plant. This recommendation is predicated upon a filter yield of 0.01 to 0.02 pound of sludge, on a dry basis, per square foot per hour. Due to such low filter yields, the practice of drying sewage sludges on sand beds in the foregoing manner is generally under a great disadvantage with respect to other filtration means such as mechanical vacuum filtration due to the amount of land required for such operations and the construction and maintenance costs of the sand beds.

A further practical problem with present techniques for static drying of sewage sludges over sand beds is that the process is largely dependent upon evaporation for success, and thus in those areas receiving substantial rainfall, or experiencing poor drying conditions, the filter yield is further diminished to render the process at an even greater disadvantage with respect to other filtration means.

It would be desirable, and it is the principal object of the present invention, to provide a novel process for the static or gravity dewatering of sewage sludges over filtering substrata, such as, for example, sand and gravel beds. A further object is to provide a static dewatering process for sewage sludges whereby the rate of drying is substantially increased, making such a process feasible for geographic areas having high rainfall. A still further object is to provide a static sewage sludge dewatering process wherein the filter yield on the filtering substrate is enhanced with increases in the depth of the sewage sludge to be dewatered above certain critical levels. A parallel objective is to substantially reduce the retention time of the sewage sludge on the filtering substrate. An additional object is to provide a novel process for dewatering sewage sludges requiring smaller filtering substrate surface area and lower construction and maintenance costs. These and other objects, as will become apparent hereinafter, are accomplished in the present invention.

The present invention is based upon the discoveries that sewage sludges, suitably treated with a water-soluble, cationic, organic polymer containing a plurality of hydrophilic nitrogenous groups, can be rapidly dewatered with the aid of gravity over a filtering substrate and that the filter yield, while initially undergoing a decrease with increases in the depth of loading of the treated sludge, is surprisingly reversed at a critical loading which occurs at a depth as hereinafter defined greater than about two feet.

The invention thus comprehends a method for dewatering a sewage sludge which comprises the steps of treating the sewage sludge with a water-soluble, cationic, organic polymer containing a plurality of hydrophilic cationic groups, preferably hydrophilic nitrogenous groups, and loading the polymer-treated sludge on a filtering substrate, readily permeable to the passage of water, at a depth greater than about two feet and at least the depth at which a continuous plot of the filter yield of the sludge solids on the filtering substrate against the depth to which the treated sludge is originally loaded thereon first achieves a slope of zero. As used herein, the terminology "filter yield" refers to the pounds of dried sludge solids obtained per square foot of the filtering substrate per hour. The dry solids content of a sludge is determined by procuring a weighed aliquot of a homogeneous sample of the polymer-treated sludge, drying the aliquot at 110° C. for four hours and thereafter weighing the residual solids. This weight is taken to be the dry solids content of the initial aliquot.

Data for a continuous plot of the filter yield against depths to which the treated sludge is originally loaded on the filtering substrate can be obtained for a given sludge, having a given polymer treatment, by conducting a series of drying rate experiments in which the treated sludge is loaded in incrementally increasing depths on partitioned segments of a filtering bed. For each incremental increase in the depth of sludge, a new drying rate and filter yield are obtained. The drying rate data are obtained by sampling the sludge loaded on the bed so as to obtain a representative aliquot of the dewatering sludge at various time intervals and determining the dry solids content of such aliquots. The filter yield, as previously defined, is then calculated.

A plot on ordinary co-ordinate graph paper of at least 4, and preferably 6, filter yields spanning loadings from 2 to 10 feet will delineate a curve. In utilizing the discovery of the invention, the depth of the sludge loading should be at least the minimum depth indicated by the point of tangency between the plotted curve and a line parallel to the abscissa. This tangency point represents the point on the plot at which the curve first achieves a zero slope. This loading is at the reversal point, above which increasing the depth of the sludge increases the filter yield.

Illustrative of sewage sludges to which the invention is applicable are the activated, raw and digested, sewage sludges conventionally produced as municipal sewage sludges, industrial process sludges and industrial waste sludges, which sludges comprise primarily organic solids. The word "activated," as used herein, applies to a sewage sludge resulting from the sequential biological oxidation of raw sewage, which may have been subjected to a primary clarification treatment prior to oxidation, followed by settling operations to recover the oxidized organic solids as an underflow sludge. A raw sewage sludge is produced by subjecting a raw sewage stream to a settling operation, with or without previous flocculation of the sewage. The settled raw sewage solids are likewise withdrawn as the underflow from the settling operation. A digested sludge is obtained by subjecting a raw or activated sewage sludge to anaerobic conditions to induce the partial biological decomposition of sewage into gaseous products.

The cationic polymers employed herein are water-soluble polymer flocculants containing a plurality of hydrophilic cationic groups. Such groups are preferably selected from the group consisting of amino, imino, ammonium and quaternary ammonium groups. The amount of the polymer used to treat sewage sludge will vary according to the electrical condition of the sludge. Preferably, enough of the polymer is added to this sludge to essentially neutralize the surface charges on the hydrophilic colloids constituting the solid suspended phase of the sludge. The treated sludge then has a zeta potential of zero or approximately zero. Some deviation from a zero potential may be tolerated when less than optimum dewatering rates are desired in the interest of economizing on the amount of polymer used.

If means for measuring the surface charge condition of the suspended phase are not readily available, a series of experiments involving adding incrementally increasing amounts of the water-soluble, cationic polymer to identical aliquots of the sludge and measuring the filtration rates achieved in a standard filterability test for each treated aliquot will serve to indicate an effective dosage of polymer for a desired dewatering rate.

Best results are obtained in the practice of the invention by applying the cationic polymers to the sludges in the form of a dilute aqueous solution. This solution will generally contain an amount within the range from about .001 to about 50 percent by weight dissolved polymer solids, and preferably an amount within the range from about .005 to about .5 percent dissolved polymer solids.

Representative of such cationic, polymeric flocculants are homopolymers and water-soluble copolymers of one or more monomers such as N-vinyl-pyridine and substituted derivatives thereof, mono-, di- or trialkylammonium salts, e.g., vinylbenzyl trimethylammonium chloride, allylamine and N-alkyl substituted derivatives thereof, aminoethyl acrylate hydrochloride or aminoethyl methacrylate hydrochloride and, in general, any ammonium or substituted ammonium alkyl acrylate or methacrylate such as N-methyl- or N,N-dimethylamino-alkyl acrylate or methacrylate, wherein the alkyl groups contain 2 or 3 carbons, or the like. Other suitable cationic, nitrogenous polymers are obtained when a nitrogen-containing monomer is copolymerized with one or more other monoethylenically unsaturated monomers capable of undergoing vinyl polymerization, provided that the resulting copolymer is water-soluble and essentially free of anionic substituents. In such copolymers, at least about 5 mole percent, preferably at least 10 mole percent, of the monomers combined in the copolymers should be cationic, nitrogen-containing monomers. Suitable monoethylenically unsaturated monomers to be copolymerized with these cationic monomers include acrylamide, methacrylamide, acrylonitrile, the lower alkyl esters of acrylic and methacrylic acids, vinyl methyl ether, N-vinyl oxazolidinone, N-vinyl pyrrolidinone and the like. It should be noted that for the purposes of preparing cationic polymers for the present invention, the amide groups, such as in acrylamide, and nitrile groups, such as in acrylonitrile, are not sufficiently cationic. However, monomers containing these groups can be employed in conjunction with other nitrogenous, cationic monomers to provide highly effective cationic polymers.

When the comonomers employed in the preparation of cationic organic polymers embody water-solubilizing groups, such comonomers may be present in amounts up to 95 mole percent of the combined moieties in the finished cationic, nitrogenous polymer. When hydrophobic comonomers such as the alkyl esters of acrylic and methacrylic acids or styrene are interpolymerized with the cationic monomers, it is necessary, in order to produce a water-soluble polymer, that at least about 60 mole percent of the combined monomer moieties be hydrophilic, i.e., bearing water-solubilizing groups. "Water-soluble," as used herein, means dispersible in water to provide a visually homogenous solution infinitely dilutable with water.

A preferred class of cationic polymeric flocculants is represented by water-soluble polyethylenimines of high molecular weight, N-alkyl substituted polyethylenimines and the mineral acid and quaternary ammonium salts thereof. Some polyethylenimines suitable for use in the invention can be represented by the formula

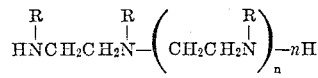

wherein R is hydrogen or methyl and $n$ has a value of at least 400, preferably of at least 2,000. Desirable polyethylenimines can be characterized by the viscosity of aqueous solutions thereof. Thus, water-soluble polyethylenimines having solution viscosities of at least about 0.8 centistoke, and preferably at least 2 centistokes, for one percent by weight solutions thereof in water, are preferred cationic polymers. Also, the various salts of these polymers such as the reaction products thereof with hydrochloric, sulfuric, phosphoric, carbonic and acetic acids are efficient cationic polymers.

Further examples of cationic, organic polymers useful in the invention include the water-soluble polyalkanes containing a plurality of hydrophilic sulfonium substituents. Specific examples of such polymers are set forth in U.S. Patent 3,060,156.

In a preferred mode of operation, which is illustrative of the invention, a series of drying beds were prepared, the filtering substrate consisting of a layer of sand approximately 9 inches deep underlain with approximately 2 feet of gravel. A digested raw sewage sludge obtained from the sewage plant of a small midwestern city was treated with a flocculant grade, water-soluble, cationic polyalkylenepolyamine.

To treat the sewage sludge, a solution containing 0.15 percent by weight of the active polymer solids was prepared. This polymer solution was added to a running cement mixer containing a given volume of the digested sewage sludge to provide a polymer dose based on dry sludge solids of about 15 pounds per ton. Mixing was completed by operating the cement mixer for an additional 30 seconds after the addition of the polymer solution. Thereafter, the polymer-treated sewage sludge is poured into a partitioned segment of the above-described drying bed in an amount sufficient to provide a layer of the treated sludge at a predetermined depth.

Subsequently, the loaded filtering beds were sampled several times during the first day of operation and thereafter once a day until effectively dewatered, i.e., having about 30 percent by weight dry solids. The percent dry solids in the samples, which were uniform composite samples taken from a representative cross-section of the sludge layer, were plotted against the depth to which the treated sludge was initially loaded on the filtering bed. This plot is shown in FIGURE 1 in the attached drawings. It will be observed that after a depth of 3 feet, the drying rate at the end of two days was no longer decreasing as the loading depth was increased. This was a highly surprising result inasmuch as one would ordinarily expect continuing decreases in the drying rate with increasing loading depths due to the likely propensity of the sludge to blind the filter in proportion to the total mass above the filtering substrate.

Upon further evaluation of the experimental data, a comparison was obtained between conventional static dewatering rates of an untreated sludge and a polymer-treated sludge in accordance with the invention. The filter yield was computed in pounds of dry solids per square foot per hour.

Figure 2:
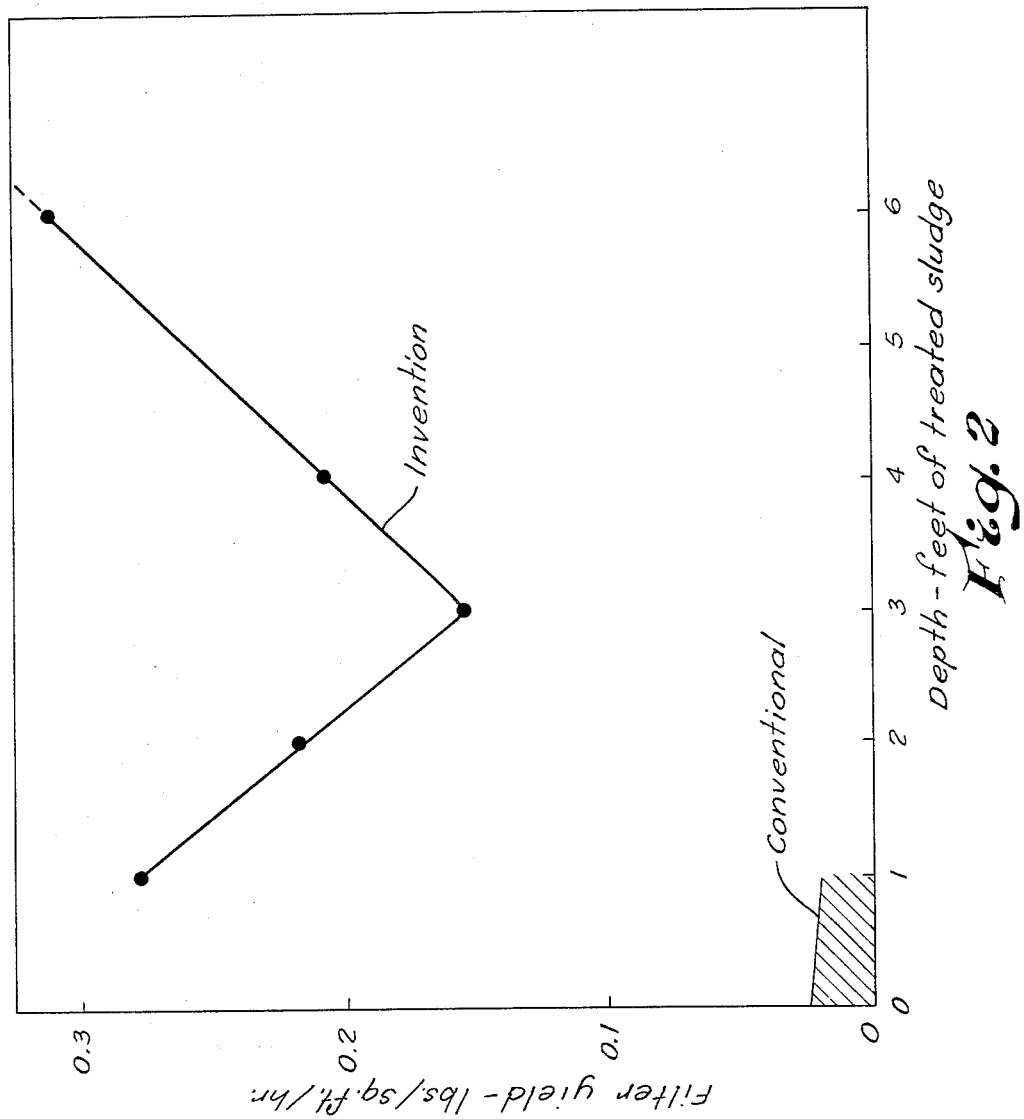

These results are plotted in FIGURE 2 shown in the attached drawings. While essentially straight lines have been used to delineate the plot, a few more points in the middle region of the plot would have defined a rounding of the curve where the downturn on filter yield was reversed toward increasing filter yields at the critical loading depth. For the particular sludge involved in these experiments, as treated with the cationic polymer described above, the critical depth at which a reversal in filter yield occurs, i.e., the aforedescribed point of tangency and zero slope, will be observed to be at about 3 feet.

What is claimed is:

1. A method for dewatering a sewage sludge which comprises the steps of:
    treating the sewage sludge with a water-soluble, cationic, organic polymer containing a plurality of hydrophilic cationic groups, and
    loading the polymer-treated sludge on a filtering substrate readily permeable to the passage of water, said loading being to a depth of at least about 3 feet whereby an effectively dewatered filter cake is formed within about five days.

2. A method as in claim 1 wherein the porous substrate is a sand bed.

3. A method as in claim 1 wherein the sewage sludge is a municipal raw sewage sludge and the porous substrate is a sand bed.

4. A method as in claim 1 wherein the sewage sludge is a digested municipal sewage sludge and the porous substrate is a sand bed.

5. A method as in claim 1 wherein the sewage sludge is a sludge obtained by settling the product from the aerobic biological oxidation of a raw sewage and the filtering substrate is a sand bed.

6. A method as in claim 1 wherein the sewage sludge is a predominantly organic slurry arising from an industrial process and the filtering substrate is a sand bed.

7. A method as in claim 1 wherein the sewage sludge is treated with a water-soluble, cationic, organic polymer in the form of a dilute aqueous solution containing from about .001 to about 50 percent by weight dissolved polymer under mildly agitating conditions.

8. A method for dewatering a sewage sludge which comprises the steps of:
    treating the sewage sludge with a water-soluble, cationic, organic polymer containing a plurality of hydrophilic cationic groups selected from the group consisting of amino, imino, ammonium and quaternary ammonium groups, and
    loading the polymer-treated sludge on a filtering substrate readily permeable to the passage of water, said loading being to a depth of at least about 3 feet whereby an effectively dewatered filter cake is formed within about five days.

References Cited by the Examiner

Bargman et al.: Sludge Filtration, etc., Sewage and Industrial Wastes, vol. 30, September 1958, pp. 1079–1100.

Keefer, Sewage-Treatment Works, first edition, 1940, McGraw-Hill, New York, pp. 416–429, 452 and 453.

MORRIS O. WOLK, *Primary Examiner.*

MICHAEL E. ROGERS, *Examiner.*